United States Patent
Sappok et al.

(10) Patent No.: US 10,425,170 B2
(45) Date of Patent: Sep. 24, 2019

(54) RADIO FREQUENCY PROCESS SENSING, CONTROL, AND DIAGNOSTICS NETWORK

(71) Applicant: Filter Sensing Technologies, Inc., Malden, MA (US)

(72) Inventors: Alexander Sappok, Cambridge, MA (US); Leslie Bromberg, Sharon, MA (US)

(73) Assignee: CTS Corporation, Lisle, IL (US)

(*) Notice: Subject to any disclaimer, the term of this patent is extended or adjusted under 35 U.S.C. 154(b) by 0 days.

(21) Appl. No.: 14/733,486

(22) Filed: Jun. 8, 2015

(65) Prior Publication Data

US 2015/0358091 A1 Dec. 10, 2015

Related U.S. Application Data

(60) Provisional application No. 62/008,505, filed on Jun. 6, 2014.

(51) Int. Cl.
 *H04B 17/00* (2015.01)
 *H04B 17/309* (2015.01)

(52) U.S. Cl.
 CPC .......... *H04B 17/00* (2013.01); *H04B 17/309* (2015.01)

(58) Field of Classification Search
 CPC .................................................. H04B 17/00
 See application file for complete search history.

(56) References Cited

U.S. PATENT DOCUMENTS

| | | | |
|---|---|---|---|
| 4,024,452 A | 5/1977 | Seidel | |
| 4,042,879 A | 8/1977 | Ho et al. | |
| 4,477,771 A | 10/1984 | Nagy et al. | |
| 4,689,553 A | 8/1987 | Haddox | |
| 5,074,112 A | 12/1991 | Walton | |
| 5,103,181 A | 4/1992 | Gaisford et al. | |
| 5,142,595 A | 8/1992 | Chester | |
| 5,157,340 A | 10/1992 | Walton et al. | |
| 5,369,369 A | 11/1994 | Cutmore | |
| 5,423,180 A | 6/1995 | Nobue et al. | |

(Continued)

FOREIGN PATENT DOCUMENTS

| CN | 1032238 A | 4/1989 |
|---|---|---|
| CN | 101078692 A | 11/2007 |

(Continued)

OTHER PUBLICATIONS

International Search Report and Written Opinion dated Aug. 21, 2015 in corresponding PCT Application No. PCT/US2015/034711.

(Continued)

*Primary Examiner* — David Bilodeau
(74) *Attorney, Agent, or Firm* — Daniel Deneufbourg

(57) ABSTRACT

A sensing and control system and method is disclosed, which utilizes cavity resonance and waveguide measurements to directly monitor process state variables or detect changes in the state of a system and provide direct in situ feedback control top optimize the process. The same system may be used to monitor a number of different process parameters including the composition, amount, distribution, and physical or chemical properties of a material, or to monitor the state or health of a system or sub-system. The system is broadly applicable to wide range of systems and process including ranging from engines and exhaust systems to production plants.

17 Claims, 3 Drawing Sheets

(56) References Cited

U.S. PATENT DOCUMENTS

| | | |
|---|---|---|
| 5,447,635 A | 9/1995 | Viscardi et al. |
| 5,497,099 A | 3/1996 | Walton |
| 5,500,599 A | 3/1996 | Stange |
| 5,557,933 A | 9/1996 | Numata et al. |
| 6,131,386 A | 10/2000 | Trumble |
| 6,147,503 A | 11/2000 | Nelson et al. |
| 6,507,308 B1 | 1/2003 | Ono et al. |
| 6,630,833 B2 | 10/2003 | Scott |
| 6,819,849 B1 | 11/2004 | Tangonan et al. |
| 6,854,261 B2 | 2/2005 | Williamson et al. |
| 7,157,919 B1 | 1/2007 | Walton |
| 7,357,822 B2 | 4/2008 | Hamahata et al. |
| 7,679,374 B2 | 3/2010 | Bromberg et al. |
| 8,384,396 B2 | 2/2013 | Bromberg et al. |
| 8,384,397 B2 | 2/2013 | Bromberg et al. |
| 8,889,221 B2 | 11/2014 | Sappok |
| 9,144,831 B2 | 9/2015 | Sappok et al. |
| 9,399,185 B2 | 7/2016 | Bromberg et al. |
| 9,400,297 B2 | 7/2016 | Bromberg et al. |
| 2001/0003898 A1 | 6/2001 | Miller et al. |
| 2001/0007571 A1 | 7/2001 | Murphy et al. |
| 2002/0005725 A1 | 1/2002 | Scott |
| 2004/0200198 A1 | 10/2004 | Inoue et al. |
| 2005/0011278 A1 | 1/2005 | Brown et al. |
| 2005/0213548 A1 | 9/2005 | Benson et al. |
| 2005/0241295 A1 | 11/2005 | Breuer et al. |
| 2006/0027511 A1 | 2/2006 | Brown et al. |
| 2006/0070373 A1 | 4/2006 | Huang et al. |
| 2006/0101793 A1 | 5/2006 | Gregoire et al. |
| 2006/0138082 A1 | 6/2006 | Strang |
| 2006/0229466 A1 | 10/2006 | Arhancet et al. |
| 2007/0000218 A1 | 1/2007 | Wirth et al. |
| 2007/0022746 A1 | 2/2007 | Decou et al. |
| 2007/0024289 A1 | 2/2007 | Knitt et al. |
| 2007/0056274 A1 | 3/2007 | Wills |
| 2007/0068157 A1 | 3/2007 | Kurtz |
| 2007/0072567 A1 | 5/2007 | Nagai et al. |
| 2007/0101705 A1 | 5/2007 | Knitt |
| 2007/0125075 A1 | 6/2007 | Zanini-Fisher et al. |
| 2007/0125349 A1 | 6/2007 | Zanini-Fisher et al. |
| 2007/0130923 A1 | 6/2007 | Dye et al. |
| 2007/0140134 A1* | 6/2007 | Clark .............. H04B 17/00 370/244 |
| 2007/0169469 A1 | 7/2007 | Knitt |
| 2007/0209333 A1 | 9/2007 | Kondou |
| 2007/0214862 A1 | 9/2007 | Kubinski et al. |
| 2008/0018442 A1 | 1/2008 | Knitt |
| 2008/0059093 A1 | 3/2008 | Bromberg et al. |
| 2008/0066621 A1 | 3/2008 | Naito et al. |
| 2008/0092499 A1 | 4/2008 | Otsuka et al. |
| 2008/0110143 A1 | 5/2008 | Chen et al. |
| 2008/0264036 A1 | 10/2008 | Bellovary |
| 2009/0033513 A1* | 2/2009 | Salsbury .............. H04W 24/00 340/4.2 |
| 2009/0038294 A1 | 2/2009 | Anderson et al. |
| 2009/0295509 A1 | 12/2009 | Master et al. |
| 2010/0101409 A1 | 4/2010 | Bromberg et al. |
| 2010/0102828 A1 | 4/2010 | Bromberg et al. |
| 2010/0262325 A1* | 10/2010 | Fernandez ............. B60L 1/00 701/22 |
| 2012/0138093 A1 | 6/2012 | Sappok et al. |
| 2013/0125745 A1 | 5/2013 | Bromberg et al. |
| 2013/0127478 A1 | 5/2013 | Bromberg et al. |
| 2013/0298530 A1 | 11/2013 | Carlill et al. |
| 2014/0116028 A1 | 5/2014 | Sappok et al. |
| 2015/0123688 A1 | 5/2015 | Sappok et al. |
| 2015/0132187 A1 | 5/2015 | Takaoka et al. |
| 2015/0355110 A1 | 12/2015 | Sappok et al. |
| 2016/0109425 A1 | 4/2016 | Sappok et al. |

FOREIGN PATENT DOCUMENTS

| | | |
|---|---|---|
| DE | 3317215 A1 | 11/1983 |
| DE | 102004016725 A1 | 2/2006 |
| EP | 0097416 A1 | 1/1984 |
| EP | 0356040 A2 | 2/1990 |
| JP | 4-505665 A | 10/1992 |
| WO | 92/02807 A1 | 2/1992 |
| WO | 93/05388 A1 | 3/1993 |
| WO | 00/50743 A1 | 8/2000 |
| WO | 2004/074670 A2 | 9/2004 |
| WO | 2005/060653 A2 | 7/2005 |
| WO | 2005/093233 A1 | 10/2005 |
| WO | 2006/002037 A2 | 1/2006 |
| WO | 2007/130896 A2 | 11/2007 |
| WO | 2009031600 A2 | 3/2009 |
| WO | 2010/074812 A1 | 7/2010 |
| WO | 2011/156477 A2 | 12/2011 |
| WO | 2014064406 A1 | 5/2014 |
| WO | 2015/188188 A1 | 12/2015 |
| WO | 2015/188189 A1 | 12/2015 |

OTHER PUBLICATIONS

Fights et al: "Tille Preparation and characterisation of ceria particles," 2013; Retrieved from the Internet: URl:htts:// :: ora.ucc.ie/bitstream/handle/10468/1141 /MorrisVNA_ PhD2013 .pdf.

* cited by examiner

RADIO FREQUENCY PROCESS SENSING, CONTROL, AND DIAGNOSTICS NETWORK

This application claims priority of U.S. Provisional Patent Application Ser. No. 62/008,505, filed Jun. 6, 2014, the disclosure of which is incorporated herein by reference in its entirety.

BACKGROUND OF THE INVENTION

Radio frequency measurements utilizing cavities and waveguides may be used in a wide range of process control systems, to monitor the state of the system, detect faults, and provide adaptive feedback control to optimize the process. Microwave cavity and waveguide measurements are useful to provide information on the state of the system in situ, without the need for sample removal and subsequent analysis, as is the case with many existing systems.

Examples to illustrate the broad applicability of radio frequency-based cavity and transmission measurement systems include: engines and engine systems, power plants, chemical plants, petroleum extraction and processing, and process sensing and controls in any number of systems.

Current sensing and control networks for process control systems suffer from a number of limitations, which are briefly summarized as follows:

First, in many systems there is a need to physically remove a sample from a discrete point in the system at specified time intervals in order to subsequently analyze the sample. These measurements incur a time delay between the time when the sample is collected and when the sample is analyzed, which may range from a few minutes to weeks or even months in some cases. The process of removing the sample may introduce additional variability in the measurements, which may be related to sample handling, the sampling method employed, and the location and timing of the sample extraction, among others. In addition to introducing potential for added variability, measurements based on extracted samples provide limited information corresponding only to the sample characteristics or state at the time of sample extraction from the system. The time delay between sample collection and receipt of measurement results does not allow for efficient process optimization or detection of faults or error conditions when they occur.

Second, many processes employ sensors to monitor the state or characteristics of various system parameters in-line. Examples of these types of sensors include temperature sensors, pressure sensors, moisture sensors, composition sensors such as gas sensors, particle sensors, and similar sensors. Most of these sensors, however, only provide a measurement of the process parameters in close proximity to the sensor or require close contact between the material being measured and the sensing element itself. Use of these types of sensors greatly restricts the type of parameters which may be directly monitored, and also limits the measurements to discrete points in the system where the sensors are located.

Third, in order to measure various different characteristics of a system, many different types of sensors are generally required, each employing a different measurement principle. For example, temperature, pressure, and gas composition sensors (oxygen, NOx, ammonia, PM) may be used in an exhaust system. Use of many different types of sensors, each with their own specific requirements and response characteristics, increases the cost and complexity of sensing and control networks.

Fourth, despite the prevalence of a large number of sensors, oftentimes the actual state variable of interest may not be measured directly, and must be indirectly estimated based on measurements from available sensors. For example, the amount of material accumulated on a filter may be inferred from pressure drop measurements across the filter, or the amount of a gas adsorbed on a catalyst may be inferred from gas composition sensors monitoring gas composition upstream or downstream of the catalyst. In another example, measurements of upstream and downstream process parameters may be used to infer or indirectly detect a failure of malfunction of a device, such as a filter or catalyst, using conventional sensors. However, in these cases, direct measurement of the required state variable, namely the amount of material on the filter or the quantity of a species adsorbed on a catalyst can not be measured directly. Such indirect estimates suffer from poor accuracy, and are cumbersome and time-consuming to calibrate.

Fifth, in many cases, there is a need to detect system faults or malfunctions when they occur, or preferentially to detect signs of faults or malfunctions before they occur. In particular, certain components in the system may mask signs of faults or malfunctions making them difficult to detect through conventional sensing means. For example, exhaust particulate filters may mask observable signs of impending engine faults, such as smoke related to high oil or fuel consumption or water vapor due to a coolant leak. Such faults are difficult to detect using conventional sensors, or may be easily mistaken or confused, using measurements from conventional sensors.

Sixth, many conventional sensors such as electrochemical gas sensors, accumulation type soot or particle sensors, and the like require contact or direct interaction of the sensing element with the material being measured. Such sensors suffer from fouling, poisoning, or aging through the build-up of contaminant material on the sensing element, which needs to be avoided.

It is, thus, desired to have an improved sensing and control network. Such an improved network may exhibit one or more of the following attributes: (i) direct measurement of the state variable or variables of interest, (ii) in-situ measurements, (iii) fast response time, (iv) the ability to sample a multiple large volumes (i.e., selectively choosing the region in the device that is being sampled) and/or detect changes in the system which may not be in close proximity to the sensing element, (v) improved measurement accuracy and feedback control, (vi) non-contact sensing methods whereby the sensing element does not need to come in contact with the material or processes being interrogated, and (vii) a simplified and less cumbersome measurement system.

It is further desirable to measure the deposition of materials on surfaces of process systems, such as walls of the device or reactor, in one example, that are detrimental to the operation of the device (such as deposits on cladding of furnaces or biofilms in chemical reactors).

Therefore, an improved process sensing and controls network is needed, which will have considerable utility for a broad range of applications and fields of uses.

SUMMARY OF THE INVENTION

A sensing and control system and method is disclosed, which utilizes cavity resonance and waveguide measurements to directly monitor process state variables or detect changes in the state of a system and provide direct in situ feedback control to optimize the process. The same system may be used to monitor a number of different process parameters including the composition, amount, distribution, and physical or chemical properties of a material, or to monitor the state or health of a system or sub-system, by monitoring the changes in the dielectric properties of the cavity or waveguide. The system is broadly applicable to wide range of systems and process ranging from engines and exhaust systems to production plants.

DETAILED DESCRIPTION OF THE INVENTION

Figure 1:
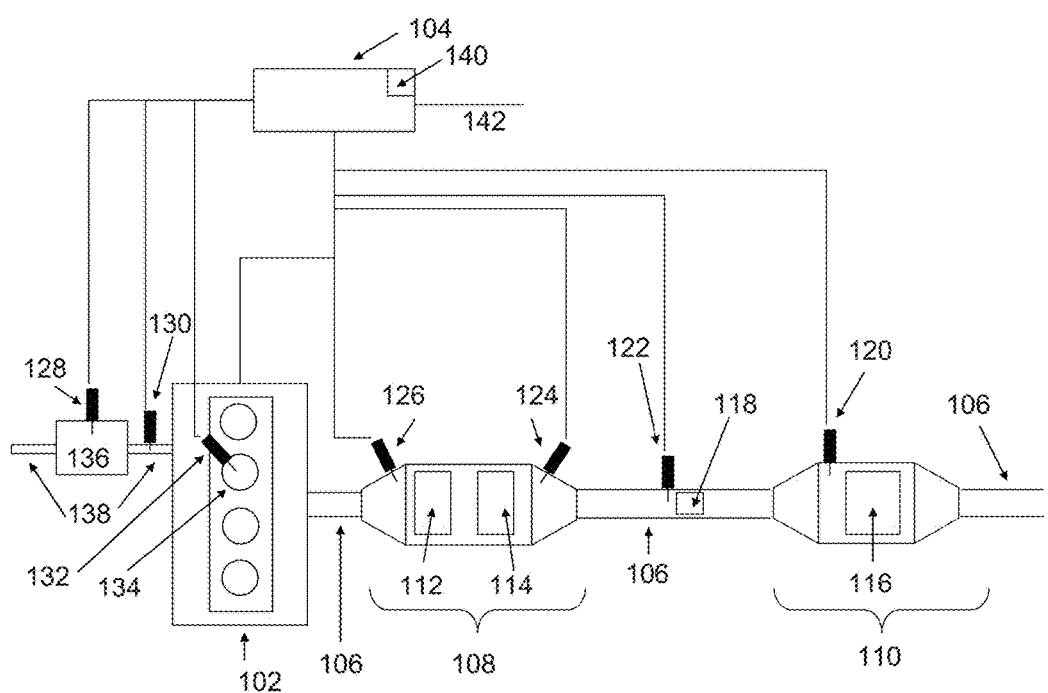
FIG. 1 represents a plant or process system, such as an engine and exhaust system in one embodiment, but may be any plant or process control system, monitored and controlled by a radio frequency system.

FIG. 1 depicts a plant such as an engine and exhaust system monitored by a radio frequency system. The plant may be any type of plant, such as a chemical plant, food processing plant, power plant, refinery, distillery, or any type of plant or process. The plant or reactor may be a flowing reactor, or it could be a batch reactor.

A machine 102, such as an engine in one example or a plant in another example, may have outlet connection, such as a conduit 106, which may be connected to various components and sensors. Machine 102 may generate an output stream, such as an exhaust stream, or any other stream, which may or may not be directed through conduit 106. In one embodiment, conduit 106 may be connected to a first module 108 and a second module 110. In one embodiment, modules 108 and 110 may be cavities, such as resonant cavities, or may be waveguides in another embodiment.

In a particular embodiment, module 108 may be particulate filter housing, such as a gasoline particulate filter or diesel particulate filter housing. Module 108 may contain multiple elements, such as a catalyst element 112, which may be a three-way catalyst (TWC), oxidation catalyst (OC), selective catalytic reduction catalyst (SCR), lean NOx trap (LNT), or any type of catalyst, and a filter element 114 such as a particulate filter. In one embodiment, module 110 may be a catalyst housing, containing a catalyst element 116 such as an SCR, LNT, TWC, ammonia storage, hydrocarbon trap, or any other type of catalyst. In another embodiment no modules 108 or 110 may be present and in another embodiment, more than one module may be present. Each module may contain one or more elements, such as catalysts, filters or membranes in one example, or no internal elements in another example.

Conduit 106 may also contain one or more internal elements 118 such as a filter, catalyst, mixer, diffuser, or other element, which may be located at any position within conduit 106. Radio frequency probes, 120, 122, 124, and 126 such as rod antennas, loop antennas, waveguides, dielectric resonators, or any other suitable probes for launch or receiving radio frequency signals may also be mounted at any position along conduit 106 or on modules 108 or 110.

Additional conduits 138 may be connected to machine 102 such as intake ducts, fuel lines, oil lines, coolant lines, or other similar conduit, such as a duct, tube, or pipe. Conduit 138 may supply an inlet stream to plant or machine 102. Conduit 138 may contain one or more modules 136 such as an air filter housing, oil filter housing, fuel filter housing, radiator, EGR cooler, fuel tank, oil tank, urea tank or any other type of module, cavity, or waveguide. Radio frequency probes 128 or 130 may or may not be installed in conduit 138 or module 136.

Although FIG. 1 depicts machine 102 as having one inlet conduit 138 and one outlet conduit 106, machine 102 may contain more than one inlet conduit, more than one outlet conduit, or no inlet conduits or no outlet conduits. Additionally, each conduit, if present, may be consist of a network for connections, passages and conduits (not shown) such as a pipe or duct system or network consisting of interconnected conduits of varying sizes and geometries. Additional modules, such as multiple modules 136, 108, 110, or 118 may or may not be present in inlet our outlet conduits.

Radio frequency probe 132 may be installed in one component of machine 102 such as a cylinder 134 in the case of an engine. Additional probes, not pictured, may also be installed in other components of machine 102. Radio frequency probes 120 122, 124, 126, 128, 130, and 132 may be connected to a control unit 104. In one embodiment, a single control unit 104 may be used to monitor and control all radio frequency probes, or more than one control unit 104 may be used. In one embodiment, the number of radio frequency probes may be more or less than those depicted in FIG. 1. Additional sensors, such as temperature sensors, pressure sensors, gas composition sensors (NOx, PM, Oxygen, Ammonia) or any other types of sensors may be used, which are not shown in FIG. 1. These ancillary sensors may be connected to control unit 104 or another control unit, such as an engine, plant, or process control unit, also not shown, which may be in communication with control unit 104.

Control unit 104 may be connected to machine 102 or to another control unit, such as an engine control unit or process control unit (not shown). Control unit 104 may contain a processing unit and computer readable storage medium 140 containing instructions, algorithms, data, lookup tables, and any other information necessary to control the connected sensors and machine. Control unit 104 may contain connection 142 which may be a communication connection, such as Ethernet, USB, analog, CAN, serial, or some other type of connection or power connection. Connection 142 may be connected to the plant control unit, to the engine control unit (ECU) in a vehicle, or to signal to the operator of the status of the unit and of potential problems.

Control unit 104 may contain hardware or electronics used to transmit radio frequency signals, such as an oscillator, as well as a detector for detecting radio frequency signals such as a diode or power detector or any other type of detector. Control unit 104 may further contain mixers, splitters, directional couplers, switches, and other components for controlling, modulating, transmitting, and monitoring radio frequency signals.

Control unit 104 may be configured to transmit and receive radio frequency signals through any of the radio frequency probes 120 122, 124, 126, 128, 130, or 132. Each probe may be independently controlled to transmit, receive, or transmit and receive radio frequency signals, such as in a multi-port network including transmission, reflection, and transmission or reflection. For example, probe 122 may transmit a radio frequency signal which may be detected by one or more probes 126, 124, 122, or 120. In another example, probe 126 may transmit a radio frequency signal that may be received only by probe 126 or by probe 124. Any number of probes may be used and one probe may or may not communicate with another probe.

Control unit 104 may further be configured to transmit and receive radio frequency signals through any of the radio frequency probes 120 122, 124, 126, 128, 130, or 132 at the same time or at different times. The probes may operate (transmit/receive) continuously, at specified time intervals, or on demand, based on a command or request from control unit 104. Each probe may operate at a specified frequency or range of frequencies, which may vary depending on the type, location, and measurement application of each probe.

The radio frequency signal characteristics may depend on the probe being used and the variable being interrogated. Thus, one probe may use a different frequency range than a second probe, as the resonant/transmission characteristics of the modules 108, 110, or 136, or the conduit 106 or 138 may be different, as well as a desired different frequency range for improved characterization of the variable being interrogated by the different probe (i.e., better selectivity or sensitivity, which could be frequency dependent). It is possible that the same probe uses multiple frequency ranges, either to improve detection of one variable, or to interrogate the unit for different variables.

The probing of the different variables in the different modules or in the same module can occur at different times, with scans by the control unit 104 sending signals to different probes at different times. It is possible to use different transmitted power (generated by control unit 104) when probing different cavities, or different power when probing for the different frequency ranges for a single probe. Thus, control unit 104 at different times can generate radio frequency signals of constant or variable amplitude, and with a different range of frequencies, being sent to selected radiating antennas, and, at a given time, receive signals from one or multiple receiving antennas.

In another example, signals generated by a probe 120 in an SCR, LNT, TWC, ammonia storage, hydrocarbon trap or any type of catalyst can be detected upstream or downstream for the module by a separate probe, such as 122, 124, 126, 132, 130, or 128, or the signal may be detected by the same transmitting probe 120 in this example. Alternatively, a signal can be transmitted by probe 128 and detected by probe 130, where module 136 is an air filter housing, an oil or fuel filter housing, EGR cooler, fuel tank, oil tank, SCR tank, or other type of filter, tank, enclosure, or catalyst. Any configuration of probes and conduit or modules may be used.

The radio frequency signals may span a frequency range such as to establish one or more resonant modes, or may span a frequency range that does not include a resonant mode, or may be at a single frequency. The various modules 108, 110, 136, and conduit 106 or 138, or machine components 134 may serve as microwave resonant cavities or waveguides, or may contain resonators (such as dielectric resonators) that can be used to sample a limited region of the device being monitored. The radio frequency signal, including resonance curve, absolute amplitude, relative amplitude (i.e., normalized to the power being transmitted by the probe), phase, resonant frequency shift, frequency shift, or some derivative thereof including local or absolute maxima or minima, frequency shift, phase shift, average value, quality factor, summation, area, peak width, or other parameter may be correlated to the state of the system and used to monitor changes in the loading state of the system. Changes in the dielectric properties within the cavities or waveguides may be used to monitor or detect one or more of the following parameters:

1. Amount of Material: such as the amount of a solid, liquid, or gas-phase component contained within or flowing through the cavity or waveguide, or escaping or leaking from the cavity or waveguide. In one example, the amount of soot or ash collected on a filter or the amount of a gas phase component adsorbed on a catalyst may be detected. Changes in the loading or storage state of a catalyst, filter or membrane may also be detected, where the loading state is due to the accumulation or loss of a solid, liquid, or gas phase component.
2. Type of Material: such as the composition of a blend of more than one type of material or species. In one example, liquid blends may be detected, such as the presence of water in fuels, biodiesel and petroleum diesel blends, ethanol and gasoline blends, coolant and water blends, soot particles in a gas, soot particles in oil, changes in the aging, oxidation or state of a liquid, such as a fuel or oil, soot and ash blends, SOF, SOL, ash and carbon fractions of particles, or any other type of blend.
3. Spatial Distribution: such as the distribution of material collected on filters, adsorbed on catalysts, deposited on the walls or surfaces of a cavity or waveguide, or blends of various components in a cavity or waveguide.
4. Physical or Chemical Properties of a Material: where the dielectric properties of a material are a function of the chemical state, such as the oxidation or reduction state, polarity, pH, conductivity or resistance, or other chemical property (due, for example, to chemisorption), or where the dielectric properties of a material are a function of physical properties such as the density, structure, phase, or other physical properties.
5. Environmental Conditions: where the dielectric properties of a material are a function of environmental conditions such as the temperature, pressure, humidity, or other related factors.
6. Position or Level: such as the position of a piston within a cylinder, crank angle, linear or rotational position, or the volume of a liquid in a tank, reservoir, or conduit such as a fuel tank, oil sump, urea tank, or any other tank or reservoir or pipe or hose.
7. Cavity or Waveguide Integrity: where changes in the material comprising the walls or structure of the cavity or waveguide affect the radio frequency signal, such as through the build-up or accumulation of material on the cavity or waveguide surfaces, the loss or escape of material from the cavity or waveguide surfaces, or changes in the cavity or waveguide surfaces such as cracking, thinning, fatigue, stress, the creation of holes, changes in the system geometry, or separation of connections such as flanges, couplings, and the like.
8. The rate of change of a process parameter: Time-resolved measurements of the radio frequency signal enable the derivative or change in the signal as a function of time to be determined. Such measurements can provide information on the rate of change of the processes described in items 1-7.

The above list illustrates several major categories of parameters that may be monitored using radio frequency means, but is by no means exhaustive. Many other parameters may also be monitored, as long as the parameters affect the dielectric properties of the cavity or waveguide.

Control unit 104 may transmit and receive signals from one or more radio frequency probes to monitor the state of various system components and functions. In one example, machine 102 is an engine such as an internal combustion engine, although machine 102 may be any type of machine, process, or plant that may be characterized by performing some function on at least one input and producing at least one output. In this example, module 136 is an air filter, an oil filter, a fuel filter, a radiator, and EGR cooler, an intercooler, tank or reservoir, or similar device and probe 128 is used to monitor the state of the device, such as the loading state of the filter or the deposition or buildup of material in the element, or the amount, quality or composition of the material in module 136 such as the amount, quality or composition of the fuel, oil, coolant, air, urea, EGR gas, or other material. In one example, probe 128 may be used to detect water, sulfur levels, oxidation state, soot buildup, a change in base number, or some other characteristic of the material within or passing through module 136.

The same measurements described in reference to module 136 and probe 128 may also be conducted in conduit 138 by means of probe 130. In this case, conduit 138 may be a pipe, tube, hose, or conduit for fuel, air, coolant, hydraulic fluid, urea, EGR line or cooler, or some other material. The measurements may be related to the material composition, amount, characteristics, or other properties.

In another example, probe 132 may be mounted in one or more engine cylinders and used to measure the position of the piston within the cylinder, the quality of the combustion process, the emissions produced by the combustion process, the quantity of fuel injected, or any other parameter, such as temperature or pressure. Probe 132 may be mounted in other locations to monitor position within other types of actuators, such as linear or rotational actuators, or void volume in tanks and reservoirs such a liquid tanks for fuel tanks or urea tanks or oil or coolant tanks, in other examples.

In yet another example, probes 126 or 124 may be used to monitor changes in the dielectric properties within module 108. Although two probes are shown, only one probe or more than one probe may be used in reflection, transmission, or some combination of the two. The probes may or may not be contained within module 108. In one embodiment, module 108 is a particulate filter housing containing a particulate filter 114 and a catalyst element 112. Module 108 may contain only a filter or a catalyst, or multiple elements, such as multiple filters and catalysts. The elements within module 108 such as catalyst element 112 or particulate filter 114 may be monitored using probes 126 or 124 in order to determine the state of the filter or catalyst, such as the loading state, aging, poisoning such as by sulfur, ash or soot accumulation or distribution, and the health or integrity of the catalyst element 112 or filter element 114 or module 108.

In addition, time-resolved measurements of the state of module 108, catalyst element 112 or filter element 114 may be used to determine the rate of material inflow or outflow from the module using probes 126 or 124. In one example, module 108 may be a particulate filter housing and the quantity of accumulated soot on the filter 114 may be determined by radio frequency measurements using probes 126 or 124, such as by monitoring phase, amplitude, or some derivative parameter or combination thereof. In this example, the radio frequency signal may be sampled at a rate faster than 1 sample per second in one embodiment, but may be faster or slower. The derivative of the radio frequency signal, or difference in the signal between successive measurements in time, provides an indication of the rate of change of soot accumulation on the filter element 114 in this example. In this manner, the entire filter element 114 may serve as an accumulation soot sensor, to determine the rate of soot accumulation on the filter element 114, not just the total accumulation.

In one example, the combined filter containing module 108 and probes 126 or 124 may function as an engine-out soot sensor, and provide engine feedback control or diagnostic information based on the rate of change of soot accumulation on the filter 114 contained within module 108. Soot oxidation models may or may not be used to compensate for soot oxidation on the filter 114 under certain conditions in this example.

In another example, module 108 may not be a particulate filter housing but may be any type of catalyst, or combined filter and catalysts system, such as a three-way catalyst coated filter, oxidation catalyst coated filter, or selective catalytic reduction coated filter. In a similar manner, the entire catalyst or catalyst coated filter may be used as a gas sensor to determine the inflow rate of a specific gas species, such as NOx, $NH_3$, HC, CO, or some other species based on the monitored rate of change of the RF signal indicative of the adsorption of the specific gas species on the catalyst surface or other interaction of the gas species of interest with the catalyst. The monitored material need not be in the gas phase or particle phase, as in the above examples, but may also be a liquid.

In one example, the monitored radio frequency parameter may be determined from absolute or relative amplitude or phase measurements or some derivative thereof, such as a maximum or minimum value, average value, frequency shift, peak or resonance width at a given power level, quality factor, or a related parameter. The parameter may be determined at a fixed frequency, or over a continuous or discontinuous range of frequencies. The frequencies my or may not include resonant conditions.

The rate of change, ($\Delta$/t), of one or more measured radio frequency parameters, P, may be computed at a specific time, t, as follows:

$$(\Delta/t) = (P_{t-1} - P_t)/((t-1)-t) \quad \text{Equation 1}$$

where the notation (t−1) indicates a measurement of the parameter P at a previous time and the subscript (t) indicates the current measurement time. In this manner, the module 108 or a portion thereof can be used to determine the rate of a constituent material of interest entering the module. The time may be measured by a timing device included in control unit 104.

Conversely, the same approach can be used to determine the rate of a constituent material of interest escaping from or exiting module 108 or 110 or 136, or conduit 138 or 106. In one example, if the rate of material entering the module 108 is known, under a specific set of conditions, for example, then the rate of change of the material levels within module 108 may be used to detect the escape of loss of material from module 108.

In one example, the loss or leakage of soot or particles from a particulate filter module 108 may be detected in this manner. In this example, operation of the engine at a condition resulting in a known rate of soot output from the engine and a known or negligible quantity of soot oxidation on the particulate filter element 114 may be used to detect failures of filter element 114 resulting in soot leakage. In this example, the rate of change of soot accumulation on the filter element 114, or the total change in soot accumulation on the filter element 114 over a specified time interval may be compared with the known amount of engine-out soot emissions entering the module 108 during this time period.

A difference in the measured soot accumulation on the filter 114 and the quantity of soot entering the filter module 108 may indicate the loss or escape of soot, due to a filter malfunction or failure such as cracked or melted regions if the increase in measured soot levels on the filter 114 is less than the quantity of soot entering module 108. One application of this example is to detect filter failures for on-board diagnostics. The time interval for the measurements may be over several seconds or several minutes in one case. The interval may encompass an entire test cycle, such as a drive cycle or modal cycle, or only one particular operating condition. The engine-out soot emissions may be previously determined, or measured by a sensor such as a PM sensor or radio frequency sensor.

The above example need not be limited to particulate filters, but any type of filter, membrane, or catalyst system, where a solid, liquid, or gas-phase constituent interacts in a measurable way with module 108, such as by deposition, adsorption, reaction with the interaction walls of 108 or certain elements 112 or 114 contained within 108. In this manner, module 108 may serve as a gas sensor, such as for NOx, CO, HC, $O_2$, $NH_3$, or any other gas, or even a liquid by means of monitoring the change in one or more radio frequency parameters, according to Equation 1. The applications include detecting the inflow or outflow of one or more components from module 108 for control or diagnostic purposes. In this manner, failures of the catalyst, such as by escape of certain gas species, may also be determined, or emissions rate of certain species generated by plant or machine 102 may also be determined for feedback control.

The above example need not be always applied to flowing reactors. When used in batch reactors, conversion rate can be determined using equation 1, with potential for determining rate of conversion as a function of both time and location in the reactor by using different probing modes/frequencies. The obtained information can be used to control the chemical reactor.

The measurements described above may also be carried out in conduit 106, such as by probe 122. Probe 122 may monitor the material passing through or deposited on the walls of conduit 106. In one example, probe 122 in conjunction with control unit 104 may operate as a frequency domain reflectometer or time domain reflectometer to monitor the location of faults, failures, or variations in dielectric properties, blockages, obstructions, or flaws and discontinuities through a portion or all of the components and systems connected to conduit 106. In this manner, multiple elements 112, 114, 118, or 116 may be monitored from a single probe, in one example. In another example, multiple probes may be used. In particular, the variable probing can involve probe 120 mounted on an SCR, LNT, TWC, hydrocarbon trap, ammonia storage catalyst or any other catalyst, and probe 122, mounted upstream or downstream of the module 110.

In another example, conduit 106 may consist of multiple branches or legs with various connections, transitions, cavities, and other elements, such as a conduit network. In one example, the conduit network is a pipeline or distributed pipe system. Probes 122, 120, 124, or 126 may be used to detect faults within the conduit network, such as a broken or disconnected conduit, or a failure of elements within the network such as elements 112, 114, 118, or 116. Failure of an element may result in leakage, such as leakage of retentate from a filter, leakage of gases, liquids, or solids, or some other materials. The failure may be detected by a change in the radio frequency monitored parameter such as an anomalous feature or discontinuity.

One distinguishing feature of the system shown in FIG. 1 is that control unit 104 may be used to monitor and control a network of probes 120 122, 124, 126, 128, 130, or 132. The network may consist of at least one probe or any number of probes. In one example, only one control unit 104 may be used to control and monitor a large number of probes. Each probe may be used to monitor a different aspect, parameter, or state, or different component of the plant, process or engine system shown in FIG. 1. The measurement can take at different time intervals, and use different radio frequency characteristics, such as frequency, phase, and/or amplitude. Measurements from the various probes may be used to provide direct feedback control of plant or machine 102. In another example, multiple control units 104 may be used.

For example control unit 104 may modify engine combustion or calibration such as fueling, air flow, boost pressure, EGR rates, injection timing, urea or hydrocarbon dosing and related parameters, based on radio frequency measurements of properties and composition of the system inputs. In one application, the blend of petroleum-based fuel and some other fuel, such as ethanol or biodiesel may be monitored. In another example, the quality or composition of urea may be monitored.

Control unit 104 may also alert the operator or trigger a fault condition based on radio frequency measurements of fuel quality, such as high water or sulfur levels. In another example, control unit 104 may alert the operator or trigger a fault condition based on radio frequency measurements of the quality, composition, or level of fuel, oil, coolant, hydraulic fluid, intake air, urea, ammonia-generating components, or other process parameters.

Control unit 104 may further modify engine and exhaust system operation based on exhaust emissions measurements using radio frequency probes mounted in conduit 106 or modules 108 or 110. In one embodiment, module 110 may be an SCR catalyst system and probe 120 may monitor ammonia storage on the SCR catalyst, using reflection measurements, or transmission with a second probe in module 110 (transmission) or using probe 122, mounted upstream or downstream from module 110 or within module 110. Control unit 104 may command urea dosing based on monitored levels of ammonia storage on SCR catalyst element 116. In another embodiment, probe 126 or probe 122 may monitor the SCR catalyst, among other elements within the exhaust system. In another example, radio frequency measurements of ammonia storage on SCR catalyst 116 from probe 120 are used communicate with Engine Control Unit to command engine lean and rich operation such as to produce ammonia from an upstream TWC catalyst, so-called passive SCR.

In another example, module 108 may be a particulate filter system and measurements from probe 126 or 124 may be used to control machine 102 operation such as to induce regeneration by increasing exhaust temperature, hydrocarbon dosing, or any other means, and also to terminate the regeneration or control the rate of temperature rise for the regeneration event.

In one example, element 118 may be an ammonia slip catalyst or small filter element, and measurements from probe 122 may be used to detect ammonia slip or particles passing through an upstream catalyst or filter for diagnostic purposes.

In another example, probe 122, 130 or any other probe may monitor the properties of the material such as any gas, liquid, or solid passing through or contained within conduits 106 or 130 or modules 136, 108, or 110.

In another example, only a single probe, such as probe 126 may be used to transmit a radio frequency signal through the entire exhaust system consisting of conduits 106 and modules 108 and 110 to monitor the processes occurring in each part of the system from a single probe. In this case, a mesh may be used to contain the signal at the exit or outlet section of conduit 106 downstream of module 110. In another example, one or more probes 126 may be used and one or more meshes or screens may be used.

In yet another example, in a chemical manufacturing plant, for example, a Fischer-Tropsch plant, the sensor can monitor the temperature of the catalyst as well as deposits of waxes or even the creation of soot on the catalyst. The chemical plant can be a flowing plant (such as a plug flow reactor) or a batch plant. In the case of a batch plant, the sensors can monitor conditions such as conversion of reagents, rate of conversion, pressure and/or temperature. Information from the control unit 104 can be used to optimize the performance of the plant.

In another example, in power plants, solid loading of a filter unit can be determined by one or more probes in the unit, and the same unit can be used for monitoring the SCR unit for NOx control. Particle loading of power plant exhaust units (bag houses or electrostatic precipitators, for example) can be measured with spatial resolution by using one probe at different frequency probing different regions of the filter, or by multiple probes. As in automotive applications, radio frequency probing of the SCR unit, the probes can detect ammonia concentration on the catalyst, and determine proper flow (uniform) of the gases and proper ammonia distribution through the reactor. It can also determine the level of activity of the catalyst, indicating potential issues with sintering or poisoning of the catalyst, indicating the need for either replacement or regeneration. The measurement in the unit can indicate issues with maldistribution of the ammonia or the flow velocities of the gases. Minimization of ammonia slip can be achieved in a highly controlled system. The same unit can be used to monitor the temperature of the reactor, to assist in proper operation of the unit, especially during transients.

Collectively, the system shown in FIG. 1 forms a radio frequency-based process control system, whereby multiple components or sub-systems may be monitored and controlled by one or more radio-frequency control units 104 in order to optimize operation of plant or machine 102, or any module 108, 110, or 136 or any other component or subsystem shown in FIG. 1. The optimization may include improved efficiency, extended durability, improved performance or output, or any other desired result, as well as the alert to any fault conditions or initiation of protective measures due to a fault condition. The optimization may be achieved by controlling one or more inputs or processes control variables to any component or sub-system shown in FIG. 1. The control may be based on direct feedback control from measurements of each probe, in order to maintain the measured values within a desired range. The control may or may not include supplemental model-based controls or inputs from other sensors or devices.

In addition to controlling system operation, faults and malfunctions may also be detected by control unit 104. Such fault conditions may be detected when a measurement from any of the radio frequency probes shown in FIG. 1 falls outside of an acceptable range, or exceeds or falls below a required threshold value. Faults include excessive emissions, such as particles (soot, ash, or any other particles) or gas such as regulated emissions, or any other material. Other system parameters that may be monitored include parameters required to meet on-board diagnostic requirements.

Potential failure modes or early signs of failure, as well as catastrophic failures of any subsystems or components shown in FIG. 1 may also be monitored. For example, use of a particulate filter system (module 108) may mask high smoke emissions, such as due to high fuel consumption, high oil consumption, a coolant leak, or related malfunction. Control unit 104 and probe 126 or 124 may be used to detect high smoke, coolant, or water vapor emissions, which may deposit on filter element 114 or pass through module 108 or conduit 106. Abnormal, such as high levels of ash accumulation on filter element 114 may also be indicative of high oil consumption.

In another example, abnormal emissions (high or low levels) of different gaseous species, such as NOx or ammonia may also be detected based on radio frequency measurements of catalysts in modules 110 or 108. Lubricant and fuel quality and condition may also be monitored by probe 130 or 128 to diagnose poor quality fuel or abnormal lubricant aging, or the presence of high soot levels or wear metal levels for example. Poor combustion may also directly be detected by probe 132. The loading state of catalyst elements 112, 114,116, as well as catalyst aging, poisoning, or other characteristics of performance degradation or changes over time may also be monitored.

Control unit 104 may also utilize inputs from other sensors such as temperature sensors, pressure sensors, gas composition sensors, position sensors, and the like, which are not radio frequency based, but are not shown in FIG. 1.

In another embodiment, elements 136, 112, 114, 118, or 116 may be utilized as the sensing elements themselves and monitored by microwave means using probes 128, 126, 124, 122, or 120. In one example, filter element 114 is a particulate filter and probe 126 or 124 may rapidly sample the quantity of soot accumulated on the filter element 114. The derivative of the monitored soot load or change in soot load over time, provides a direct measure of engine-out soot emissions. Control unit 104 may provide a feedback control to machine 102 based on the measured engine-out soot emissions from filter element 114. In one example, the sample rate may range from 1 to 10 Hz, but may be faster or slower in some cases. In the same manner, the instantaneous change in the loading state of any element 136, 112, 114, 118, or 116 may be monitored using probes 128, 126, 124, 122, or 120 to provide a real-time or continuous measurement of the rate of material addition, accumulation, adsorption, or loss on any of these materials from the element. In another example, catalyst element 112 is a TWC and the real-time oxygen concentration may be measured by probe 126 or probe 124. In another example, catalyst element 116 is an SCR or LNT and the NOx emissions rate or ammonia dosing rate may be directly monitored. In yet another example, the concentration of a material in a conduit, such as conduit 106 may also be measured.

Figure 2:
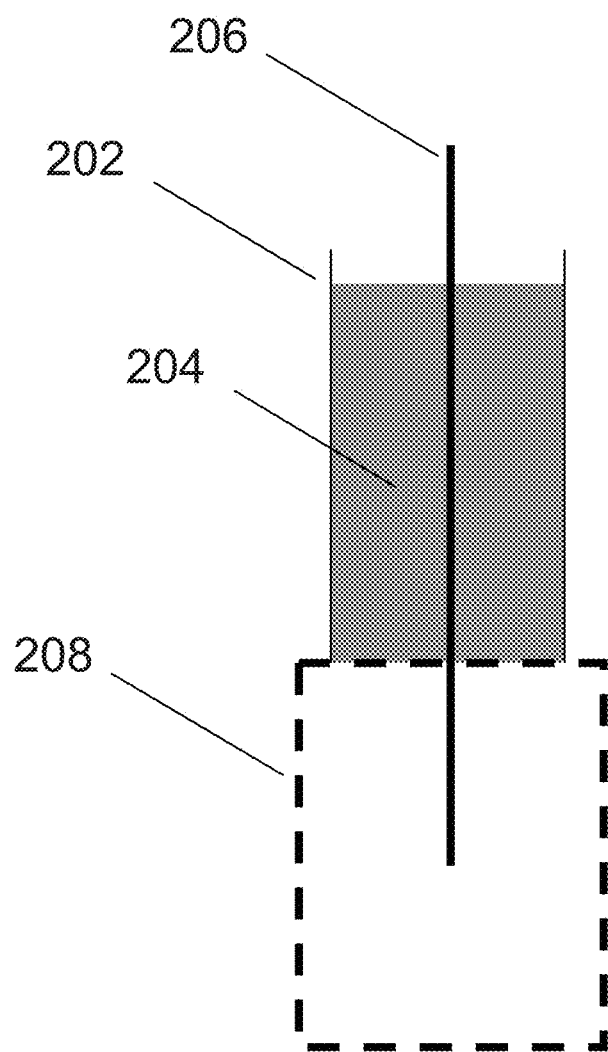
FIG. 2 represents a radio frequency probe in one embodiment.

FIG. 2 presents additional details of a radio frequency probe, which may or may not be the same as probes 120 122, 124, 126, 128, 130, or 132 shown in FIG. 1. The probe may be comprised of a conductive outer sleeve 202, inner dielectric 204, and inner conductor 206. Alternatively, the probe may be a waveguide of loop antenna, or any other type of antenna. A perforated conducting mesh, screen, other housing or sheath 208 may or may not be in electrical contact with conductive outer sleeve 202. Inner dielectric may or may not extend fully- or partially over inner conductor 206 to fully- or partially cover inner conductor 206.

In one example, sheath 208 may not be used and inner conductor 206 may extend beyond inner dielectric 204. In another example, sheath 208 may not be used but inner dielectric 204 may extend and cover inner conductor 206. In one example, material such as solids, liquids, or gases may collect or adsorb onto inner dielectric 204 directly and may be measured. In another example, sheath 208 may be used, and serves to contain the radio frequency signal within the region of the sheath. In this manner, the signal is decoupled or unaffected by the surrounding environment, but is still exposed to a flow of material which may pass through the perforations or mesh. In one example, the probe shown in FIG. 2 is a soot sensor or a gas sensor or a liquid sensor.

Figure 3:
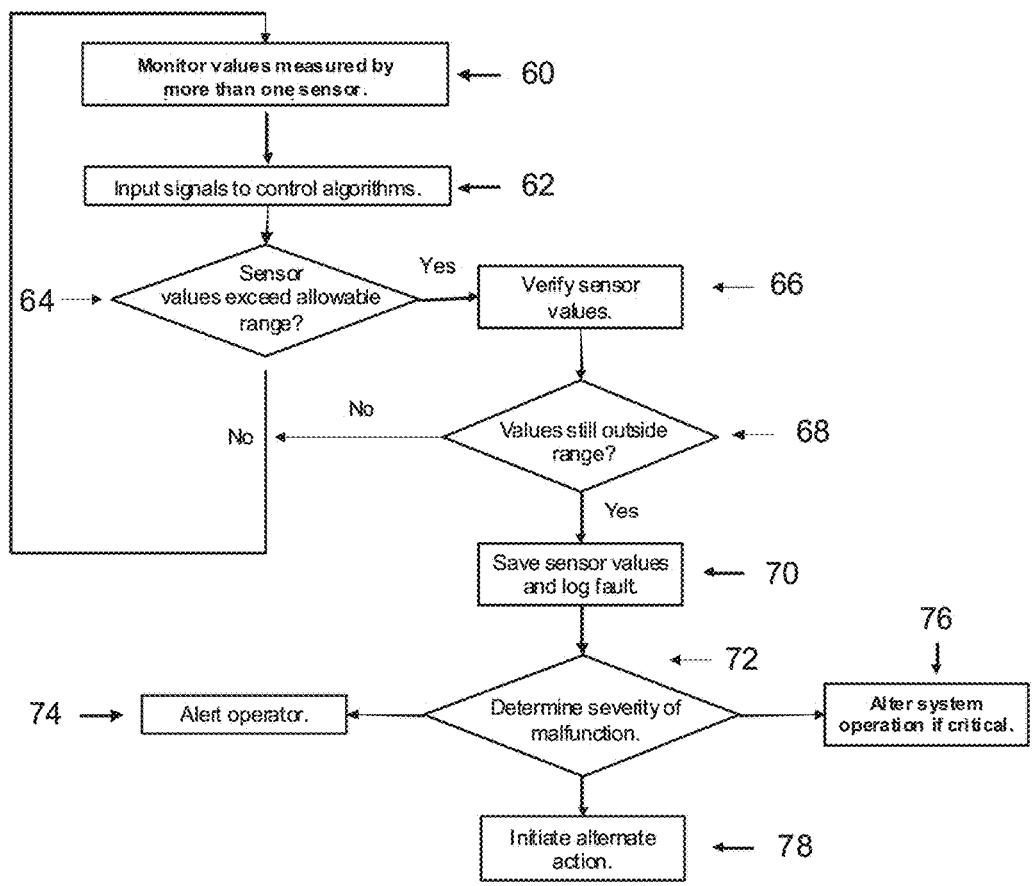
FIG. 3 represents a process flow diagram for a radio frequency-based control system, which may be an engine system in one embodiment, but may be any plant or process control system.

One non-limiting method of control unit operation is described in the flow chart showing the system control logic in FIG. 3. Although the figure refers specifically to an exhaust system, it is intended that the same logic may be applied to any process control system, including engines, plants, machines, and the like. A number of inputs from the radio frequency probes shown in FIG. 1, as well as additional sensors such as temperature, pressure, flow, composition sensors, and the like are acquired and monitored by the control unit 104, as shown in Step 60. Sensor outputs (in the disclosure, the terms "sensor" and "probe" are used interchangeably) are then utilized by control algorithms contained on computer readable storage media 140 in the control unit 104, as shown in Step 62. Furthermore, Step 62 may comprise correcting any sensor or probe values based on measurements from another sensor or probe, or stored on within control unit 104. In one example, such corrections may include correction of the RF signal, or RF determined signal parameter, based on measurements from a temperature sensor, or other type of sensor. In another example multiple RF parameters may be utilized (amplitude, phase, frequency) or derivatives thereof to determine the final sensor value. In an exemplary embodiment, both the amplitude and phase signals may be used. Control unit 104 may further contain a timing mechanism, to provide time-resolved information.

Instructions stored in the control unit 104 are used determine whether any of the sensor values is outside of an allowable range, or exceeds some threshold value, as shown in Step 64.

If no sensor values are outside the allowable range, the control algorithm reverts back to Step 60. If one or more sensor or probe values is outside the allowable range, the sensor measurement is verified one or more times, as shown in Step 66. Verification may be carried out through repeat measurements from the same sensor or measurements from related or redundant sensors to confirm sensor performance, or by comparison with additional models, lookup tables, or stored values. Plausibility checks, such as by conducting multiple measurements of the same parameter by operating one or more probes in reflection, transmission or reflection and transmission mode may be used to verify sensor values. Instructions stored in the computer readable storage media 140 in the control unit 104 are used to determine whether the sensor value is truly outside of an allowable range, or above some threshold value, as shown in Step 68. If the sensor value is confirmed to be outside the acceptable range, the computer control unit 104 may save a number of sensor values and log a fault, as shown in Step 70. The saved sensor values may or may not be from the same sensor measuring an abnormal value.

Additional instructions in the computer readable storage media 140 in the control unit 104 will then be used to determine the severity of the malfunction and the actions to be taken, as shown in Step 72. The control unit 104 may alert the operator to the malfunction, as shown in Step 74; alter engine, exhaust aftertreatment operation, or plant, as shown in Step 76; or carry out some alternate operation, as shown in Step 78.

It may also be possible to monitor the status of the engine system or chemical plant by the introduction into the stream of a compound. The introduced compound can be present under normal operating conditions of the machine, or it can be one that is foreign. The introduction of the compound would result in a change in chemical or physical properties (that results in change in effective dielectric constant of the catalyst or filter in the machine); the change in dielectric constant can be monitored using the microwave system. The introduction of the material can be switched on and off, allowing the sensing of the microwave response to changes in the dielectric constant of the machine.

Those skilled in the art will surely realize that the steps described above may be carried out in another sequence without deviating from the intent and scope of the invention.

While particular embodiments of the invention have been shown and described, it will be obvious to those skilled in the art that various changes and modifications may be made without departing from the present invention in its broader aspects. It is intended that all matter contained in the above description and shown in the accompanying drawings shall be interpreted as illustrative and not in a limiting sense.

What is claimed is:

1. A radio frequency process control system comprising:
   a plant or machine requiring at least one input and generating at least one output stream;
   at least a first module, conduit, or component in the plant or machine forming a resonant cavity for containing radio frequency signals;
   at least a second module, conduit, or component in the plant or machine forming a resonant cavity for containing radio frequency signals;
   at least a first radio frequency probe in the resonant cavity of the at least first module, conduit, or component to transmit and/or receive the radio frequency signals;
   at least a second radio frequency probe in the resonant cavity of the at least second module, conduit, or component to transmit and/or receive the radio frequency signals; and
   a single radio frequency control unit, in communication with both of the at least first and second radio frequency probes, to (i) monitor at least a change in the phase of said radio frequency signals transmitted and/or received through the resonant cavity of each of the first and second modules, conduits, or components and (ii) measure more than one parameter selected from the group including amount of a material, type of the material, spatial distribution of the material, physical or chemical properties of the material, environmental conditions, position or level, cavity integrity, or rate of change of the parameter, based on at least a measurement of the change in the phase of said radio frequency signals transmitted and/or received through the resonant cavity of each of the first and second modules, conduits, or components, the radio frequency control unit containing the components for transmitting, detecting, controlling, modulating, and monitoring the radio frequency signals transmitted and/or received by the at least first and second radio frequency probes.

2. The system of claim 1, wherein said at least first and/or second module, conduit, or component is selected from the group including catalyst, substrate, filter, cavity, or housing, or engine.

3. The system of claim 1, wherein said radio frequency control unit determines leakage of a material through said output stream, based on measured material accumulation in said output stream and known emissions of said material from said machine.

4. The system of claim 1, wherein said radio frequency control unit determines an amount, quality or composition of a material in said at least first and/or second module, conduit, or component.

5. The system of claim 4, wherein said material is selected from the group consisting of fuel, oil, coolant, air, urea, and EGR gas.

6. The system of claim 1, wherein said at least first or second module, conduit, or component comprises an engine of the plant or machine, and the at least first or second radio frequency probe is disposed in a cylinder of said engine, to monitor one or more engine parameters.

7. The system of claim 6, wherein the one or more engine parameters are selected from the group consisting of position of piston, quality of combustion process, emissions processed by said combustion process, quantity of fuel injected, temperature and pressure.

8. A radio frequency sensing system, comprising;
a first radio frequency probe to transmit and/or receive radio frequency signals within a first cavity within a machine, the first radio frequency probe extending in the first cavity and the first cavity containing the radio frequency signals;
a second radio frequency probe to transmit and/or receive radio frequency signals within a second cavity within the machine, the second radio frequency probe extending in the second cavity and the second cavity containing the radio frequency signals;
a timing device; and
a single radio frequency control unit, in communication with both of the first and second radio frequency probes and the timing device, to monitor at least a change in the phase and amplitude of the transmitted and/or received radio frequency signals and to measure a change in said determined process parameter based on inputs from said timing device and a measurement of the change in the phase and amplitude of the transmitted and/or received radio frequency signals, and to initiate an action based on said change in said determined process parameter, the radio frequency control unit containing all of the components for transmitting, detecting, controlling, modulating, and monitoring the radio frequency signals transmitted and/or received by both of the at least first and second radio frequency probes.

9. The radio frequency sensing system of claim 8, wherein said radio frequency control unit provides diagnostic information to an operator based on said change in said determined process parameter.

10. The radio frequency sensing system of claim 9, wherein said diagnostic information is selected from the group consisting of an indication of a failure of a filter element, an indication of a failure of a catalyst element, an indication of a broken conduit, and an indication of a blockage or obstruction in said machine.

11. The radio frequency sensing system of claim 8, wherein the radio frequency control unit modifies operation of said machine based on said change in said determined process parameter.

12. The radio frequency sensing system of claim 11, wherein said radio frequency control unit modifies fueling, air flow, boost pressure, EGR rates, injection timing, urea or hydrocarbon dosing.

13. A machine, comprising:
at least one input and generating at least one output stream;
a plurality of independently controlled radio frequency probes mounted in at least first and second cavities within said machine to transmit and/or receive radio frequency signals contained in and propagated through the at least first and second cavities within said machine, each of the plurality of radio frequency probes being operable at a specified frequency or range of frequencies which may vary depending on the type, location, and measurement application of each of the plurality of radio frequency probes; and
a single radio frequency control unit, in communication with all of the plurality of radio frequency probes, to monitor a change in at least the phase of said radio frequency signals transmitted and/or received through the first and second cavities, measure more than one parameter, based on at least a measurement of the change in the phase of said radio frequency signals transmitted and/or received through the first and second cavities, and initiate an action based on said measured parameters, the radio frequency control unit containing all of the components for transmitting, detecting, controlling, modulating, and monitoring at the same time or at different times the radio frequency signals transmitted and/or received by all of the plurality of radio frequency probes.

14. The machine of claim 13, wherein at least a first radio frequency probe monitors said input and at least a second radio frequency probe monitors said output stream.

15. The machine of claim 13, wherein said radio frequency control unit modifies an operation of said machine based on said measured parameters.

16. The machine of claim 13, wherein said radio frequency control unit alters an operator of a fault condition based on said measured parameters.

17. The machine of claim 13, wherein said radio frequency control unit is in communication with a timing device, and said radio frequency control units determines a rate of change of said measured parameters.

* * * * *